United States Patent [19]
Lairson et al.

[11] Patent Number: 5,834,085
[45] Date of Patent: Nov. 10, 1998

[54] GRAIN ISOLATED MULTILAYER PERPENDICULAR RECORDING MEDIUM

[75] Inventors: Bruce M. Lairson; Wenhong Liu, both of Houston, Tex.

[73] Assignee: Densitek Corporation

[21] Appl. No.: 607,003

[22] Filed: Feb. 26, 1996

[51] Int. Cl.[6] ..................................................... G11B 5/66
[52] U.S. Cl. ..................... 428/65.3; 428/216; 428/336; 428/611; 428/615; 428/668; 428/670; 428/694 TS; 428/694 TM; 428/900; 428/928
[58] Field of Search ..................................... 428/65.3, 216, 428/336, 611, 615, 668, 670, 694 TS, 694 TM, 900, 928

[56] References Cited

U.S. PATENT DOCUMENTS

| | | | |
|---|---|---|---|
| 4,438,066 | 3/1984 | Aboaf et al. | 420/435 |
| 4,587,176 | 5/1986 | Carcia | 205/103 |
| 5,023,148 | 6/1991 | Fisher et al. | 428/694 |
| 5,158,653 | 10/1992 | Lashmore et al. | 428/611 |
| 5,162,158 | 11/1992 | Christner et al. | 428/611 |
| 5,565,266 | 10/1996 | Hatwar et al. | 428/332 |
| 5,604,030 | 2/1997 | Yamane et al. | 428/332 |

FOREIGN PATENT DOCUMENTS 0 304 927   1/1989   European Pat. Off. .

OTHER PUBLICATIONS

D. J. Rogers et al., Investigations of Compositional Separation in C0–Cr Thin Film Recording Media, *Journal of Magnetism and Magnetic Materials*, 130 Jan. (1994), pp. 433–441.

Bruce M. Lairson et al., Application of Pd/Co Multilayers for Perpendicular Magnetic Recording, *Applied Physics Letters*, 64 (21), May 23, 1994, pp. 2891–2893.

*Primary Examiner*—Stevan A. Resan
*Attorney, Agent, or Firm*—Mark Lauer

[57] ABSTRACT

A new type of multilayer structure is shown which has superior properties for retaining magnetic transitions on a surface as they are written by a recording transducer. The multilayer is composed of crystal grains which are electronically isolated from one another (exchange isolated). The exchange isolation of the grains creates a type of medium which can viably store data at more than 2 billions bits per square inch. A method is described for making such a structure and the storage of magnetic transitions at extremely high density is demonstrated. Recording with previous multilayer candidates is also shown for comparison purposes.

10 Claims, 6 Drawing Sheets

GRAIN ISOLATED MULTILAYER PERPENDICULAR RECORDING MEDIUM

BACKGROUND—FIELD OF THE INVENTION

The present invention relates to the field of thin film recording media, and in particular to thin film recording media for recording magnetic information in the direction perpendicular to the thin film plane.

BACKGROUND—DESCRIPTION OF PRIOR ART

It is well known from recent experiments in materials science that magnetically uniaxial magnetic structures can be produced from multilayering the constituent elements or alloys, in particular, thin films with a preferred magnetization perpendicular to the plane of the thin film ("perpendicular magnetic anisotropy"). The highly directional physical properties of perpendicular magnetic thin films makes them promising as media for magnetic recording applications.

A major objective of research efforts in thin film magnetic materials is to make recording media with properties which are suitable for higher density recording. Practically all recording media in use at present possesses magnetic domains which are oriented in the plane of the recording medium. While magnetic recording in the direction perpendicular to the plane of the medium has some advantages in principle, relatively few recording media candidates exist for such an application. Recording media must have directionality or anisotropy (e.g. "departure from isotropy") in order to function. Perpendicular recording media typically require large anisotropy, limiting the choice of materials for recording media. Leading candidates have been ferrites (Naoe et al, IEEE Trans. Magn. NAG-17-3184 (1981)), Co based alloys (Iwasaki, et al., IEEE Trans. Magn. MAG-14:849, 1978)), and Pd/Co or Pt/Co multilayers (Lairson, Appl. Phys. Lett. 64:2891 (1994)). In particular, the Pd/Co and Pt/Co multilayers were found to possess very promising parametric performance at high recording densities, but showed unfavorable domain noise and overwrite properties. Exemplary of the ferrites is the method for preparing perpendicular recording media disclosed by Oguchi et al., U.S. Pat. No. 4,447,467. Exemplary of Co alloys is the method for preparing perpendicular recording media by Kostenmaki, U.S. Pat. No. 4,472,248. Exemplary of preparing Pd/Co multilayers is the method of Carcia, U.S. Pat. No. 4,587,176. In particular, Carcia showed if Pd and Co or Pt and Co are layered, for Co thicknesses less than about 8 Å and for noble metal thicknesses greater than about 1.8 times the thickness of the cobalt, a medium having perpendicular magnetic anisotropy is obtained.

The limitations experienced in magnetic recording with multilayer media are traceable to the grain structure of the multilayers themselves. It is desirable in some recording media to have extremely well-isolated grains, such that little electronic ("exchange") coupling exists between adjacent grains in the material. While the grains in Pt/Co and Pd/Co multilayers are small, typically less than 1000 Å in diameter, they do not behave as independent magnetic particles. If adjacent grains are coupled by electronic exchange energy, higher noise appears in the readback signal of a recording transducer representing the larger-scale magnetic domains present in the structure. The structure of Carcia does not have exchange decoupled grains, and is therefore not suitable as a high density recording medium. Liu, et al (W. Liu, et al., Journal of Applied Physics, in press) have formulated a post-processing treatment to improve the grain decoupling in those structures, but have not discovered a technique to produce decoupled multilayers of the type specified by Carcia.

The exchange coupling between adjacent grains is also observable in the external magnetic properties via magnetometry. Thin films less than 1000 Å thick with coupled grains generally yield "square" hysteresis loops, i.e. a slope of the magnetization curve dM/dH which is greater than the demagnetizing field value of about $1/4\pi$.

Examples of the impact of coupling on noise and magnetic hysteresis loops are shown in FIGS. 1 and 2. FIG. 1 shows the noise spectrum versus frequency obtained from a traditionally sputtered Pt/Co multilayer with perpendicular anisotropy (open circles). FIG. 2a shows hysteresis loops for granular CoCrTa alloy media; FIG. 2b shows the corresponding loop for a Pd/Co multilayer media. The granularity of the alloy media is apparent from the reduced squareness of the hysteresis loop. The slope dM/dH of the alloy hysteresis loop is approximately $1/4\pi$, where the magnetization M is expressed in units of emu/cm$^3$, and the magnetic field is measured in units of oersted. The multilayer in FIG. 2b is observed to have much less shearing of the hysteresis loop, which results in a value of the slope dM/dH several times greater than $1/4\pi$. It is relevant to note that simply alloying the Co layer with an additional element, such as Cr or Ta, does not result in grain isolation of the recording media, as evidenced by FIG. 3c) (Lairson et al., Appl. Phys. Lett., 64:2891 (1994)). Despite the addition of Cr, which typically produces grain isolation in Co alloy perpendicular media, the multilayer structure remains exchange coupled, as evidenced by the squareness of the hysteresis loop. This squareness appears in recorded data as noise, shown for Pt/Co multilayers in FIG. 1. A medium which is not exchange coupled shows a much lower level of noise in a recording transducer and also a more sheared hysteresis loop.

A reduction in the exchange coupling between adjacent magnetic grains in a thin film results in reduced noise into the recording transducer and allows magnetic transitions to exist closer together in a recording medium, resulting greater density storage of information.

An important but competing requirement for magnetic data storage media is that the recorded data must last for a substantial period of time, generally years. It has been shown recently (Lairson, et al., submitted to Journ. of Appl. Phys.) that the remanence ratio (the ratio of the remanence to the saturation magnetization) must be close to or equal to 1. Thus, while the media shown in FIG. 2a is grain decoupled, data recorded in this medium will slowly decay because the remanence ratio is only 0.3, which is substantially less than 1. The multilayers shown in FIGS. 2b and 2c, on the other hand, have a remanence ratio of approximately 1, and do not show decay of recorded transitions. A consideration of magnetization decay in the context of data storage yields the need for recording media which has a remanence ratio of greater than about 0.8. Clearly, for a given coercive field (the field at which the magnetization crosses zero) strong coupling between grains improves the perpendicular remanence, since the loops are less sheared in this case, and reach the saturation magnetization in a smaller increment of the applied field. It is attractive to attempt to fabricate a recording medium which possesses high relative remanence but in which the grains are decoupled. It is also attractive to attempt to fabricate such a medium from multilayers, since some of the properties of multilayers are advantageous for recording data. We herein point out the desirability of such a structure and the realization of an exchange isolated multilayer recording medium.

OBJECTS AND ADVANTAGES OF THE INVENTION

Pt/Co and Pd/Co multilayers possess superior parametric performance and do not exhibit decay of recorded data, but do exhibit poor phase margin and media noise characteristics in data storage tests. In view of this and the above, it is an objective of the present invention to produce multilayer thin films in which the grains are not exchange coupled.

It is another objective to produce decoupled multilayer recording media for which the remanence ratio is nearly equal to 1. Since greater decoupling increases shearing of the hysteresis loop, there is some competition between the production of grain isolation and full perpendicular remanence.

The primary advantage of the invention is that it allows archival data to be stored with a very small distance between adjacent magnetic transitions. Individuals skilled in the art of magnetic recording generally speak of a "linear density barrier" which has slowed the development of magnetic recording. Generally, for longitudinal magnetic recording, data is limited to less than 200,000 transitions per inch even in the most advanced demonstrations, while recording products are generally limited to less than 140,000 transitions per inch. The current invention allows transitions to be stored at much higher linear densities. For instance, below we show the storage of transitions at a linear density of 308,000 transitions per inch. Further improvements are anticipated allowing greater density of transitions.

SUMMARY OF THE INVENTION

The present invention is a structure possessing composition modulation (multilayering) in the direction perpendicular to the film plane and possessing crystal grains that are electronically exchange isolated from one another. We give example methods for producing layered thin films which retain the strong perpendicular magnetic anisotropy necessary for perpendicular magnetic recording but which have granular magnetic properties and greater than 80% remanence in the perpendicular direction.

Grain isolated multilayers are formed by alternately depositing Pt or Pd and CoCrTa alloy at elevated temperatures (100° C.–300° C.), wherein each Pt or Pd layer is less than 10 Å thick and each CoCrTa layer is greater than 8 Å thick. The structure formed has the morphology shown in FIG. 3.

DETAILED DESCRIPTION OF THE INVENTION

Figure 1:
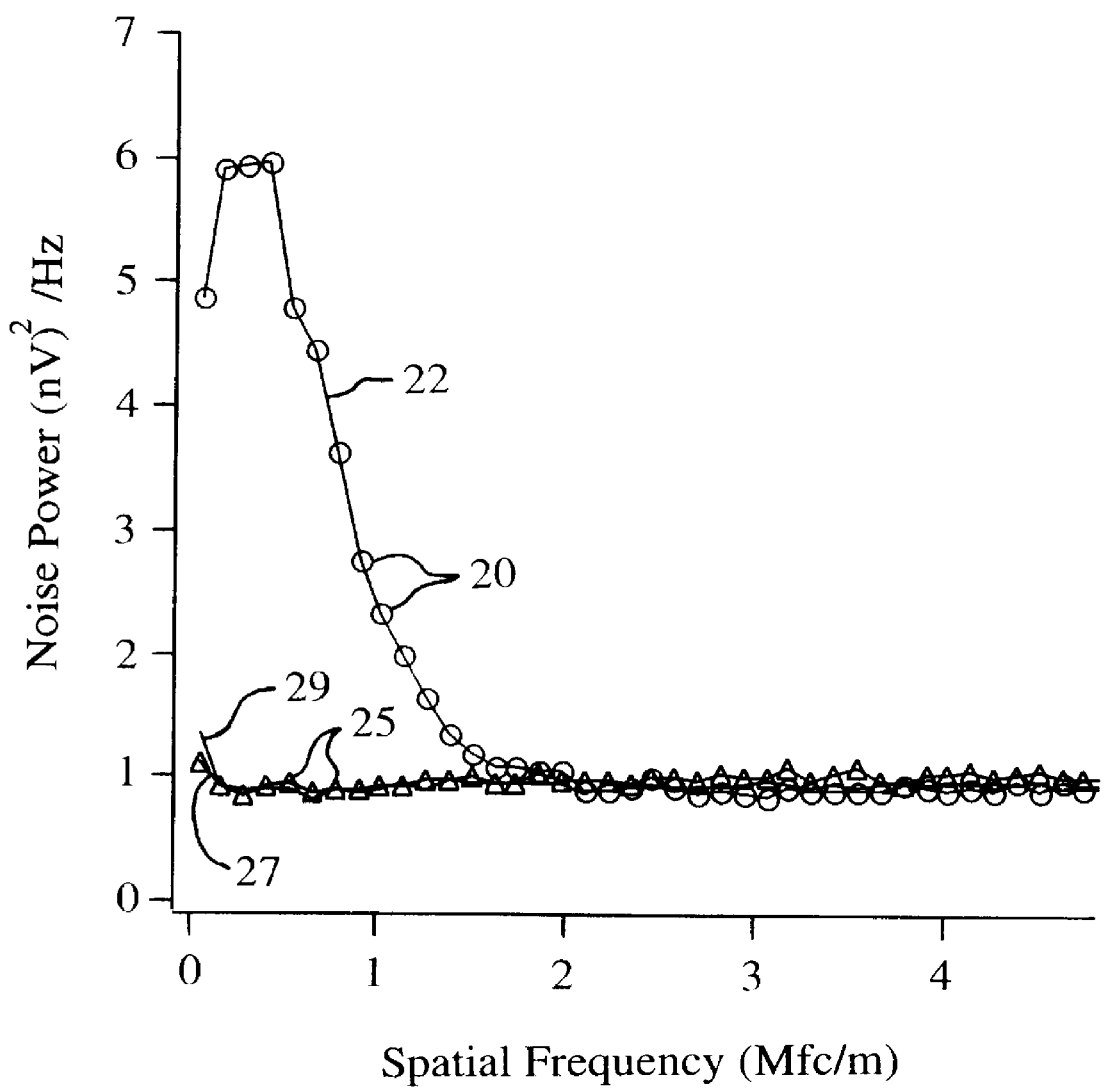
FIG. 1 shows noise amplitude versus frequency in millions of flux changes per meter for as-deposited exchange coupled Pt/Co thin film recording medium (open circles), using a commercial recording transducer on a disk which has been coated with the recording medium. Also shown is the noise amplitude versus frequency obtained using the same transducer on grain isolated Pt/CoCrTa multilayer media (triangles).
Figure 2A:
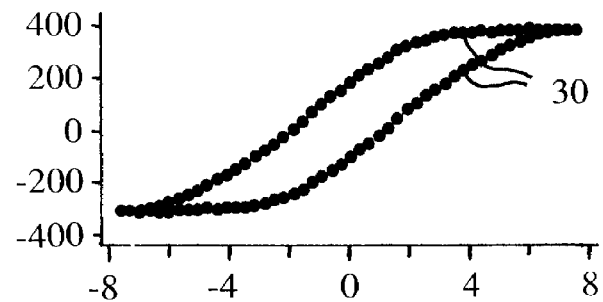
FIG. 2a is a hysteresis diagram showing magnetic hysteresis loop for a CoCrTa alloy with the field applied perpendicular to the media plane. The ratio of the magnetization at zero applied field to the magnetization at high applied field is the remanence ratio, which is about 0.3. The shearing of the hysteresis loop is approximately $\frac{1}{4}\pi$.
Figure 2B:
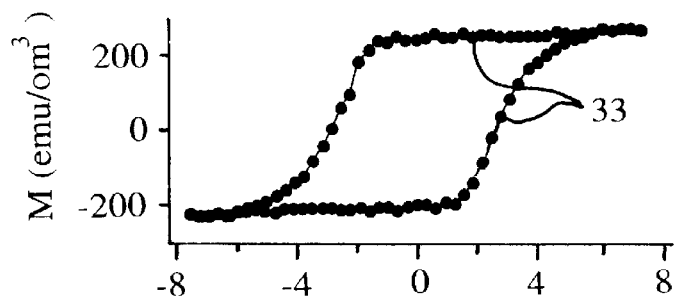
FIG. 2b is a hysteresis diagram showing magnetic hysteresis loop for a Pt/Co alloy with the field applied perpendicular to the media plane. The remanence ratio for this coupled multilayer is about 0.95. The shearing of the hysteresis loop is approximately $[2.5]/4\pi$.
Figure 2C:
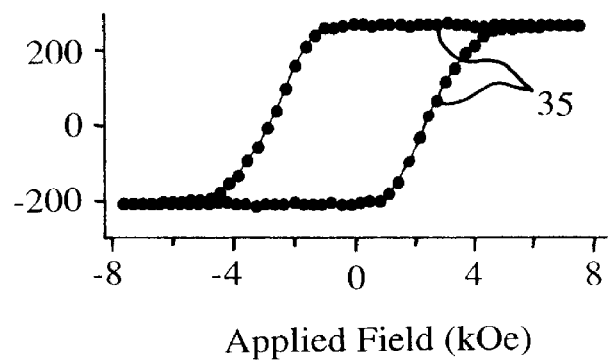
FIG. 2c is a hysteresis diagram showing magnetic hysteresis loop for a Pt/CoCr alloy with the field applied perpendicular to the media plane. The remanence ratio for this coupled multilayer is about 0.95. The shearing of the hysteresis loop is approximately $[2.0]/4\pi$.

The materials provided by the present invention are grain isolated layered thin film structures in which the layered materials are Pt, Pd, a Pt-rich alloy or a Pd-rich alloy, and Co alloys containing Cr or Ta. These structures consist of alternating layers where each Pt-rich or Pd-rich layer is thinner than the Co alloy layer, and each Co alloy layer thickness is greater than 10 Å. Generally, the advantage of multilayering on perpendicular anisotropy decreases as thickness increases, and contributes little anisotropy for Co alloy thicknesses greater than about 50 Å.

The total thickness of the multilayer is not critical to the present invention, but will generally be in the range from 50 Å to 500 Å.

Preferably, the thickness of the Co-containing layer will be greater than approximately 8 Å to achieve grain isolation. Thinner Co-alloy layers result in a substantial amount of intergranular coupling even when the appropriate temperatures and alloy compositions are employed. This is because grain isolation occurs by the formation of crystallographic grains, separated by grain boundaries in the medium. The Co alloy layer must be thick enough to achieve this structure. The Co alloy layer must also contain an elemental constituent which segregate out of the grains toward grain boundaries, to achieve grain isolation. Examples of such constituents are carbon, chromium, tantalum, tungsten, and vanadium. The Co alloy must contain at least 60% cobalt to maintain suitable magnetic properties. For instance, CoCrTa becomes nonmagnetic if the Co content is reduced below 70%. The Co alloy layer must contain no more than about 95% Co to allow phase segregation to occur. Fewer segregating impurities in the Co layer will allow a grain structure to occur, but will not allow the boundaries between grains to become nonmagnetic.

The total thickness of the Pd-rich or Pt-rich layer is between 2.2 Å and 15 Å. Deposition of less than 2.2 Å of the noble metal will not allow a full monolayer to be formed, resulting in inadequate composition modulation contrast between adjacent layers. Poor composition modulation will result in insufficient perpendicular magnetic anisotropy energy. Thicknesses of noble metal layers greater than about 15 Å will result in lower saturation magnetization values, which are unattractive for data storage applications. The best results are obtained with a Pt rich noble metal layer, because in addition to composition modulation, the alloy CoCrTaPt has higher perpendicular anisotropy than CoCrTaPd. It is therefore easier to make CoCrTa/Pt multilayers with attractive recording properties, because if some interdiffusion between the constituent layers occurs, the alloy formed will also have attractive perpendicular recording properties. The cases below focus on Pt as a noble metal layer for this reason. We estimate that approximately one half of the perpendicular anisotropy energy results from multilayering in this case.

The structures of the present invention can be formed as thin films upon a variety of substrates, for example silicon nitride, aluminum, nickel iron alloys, glass or plastic. The structures of the present invention can be prepared in a number of ways, including DC sputtering, RF sputtering, vapor deposition, liquid phase epitaxy, and others.

Figure 3:
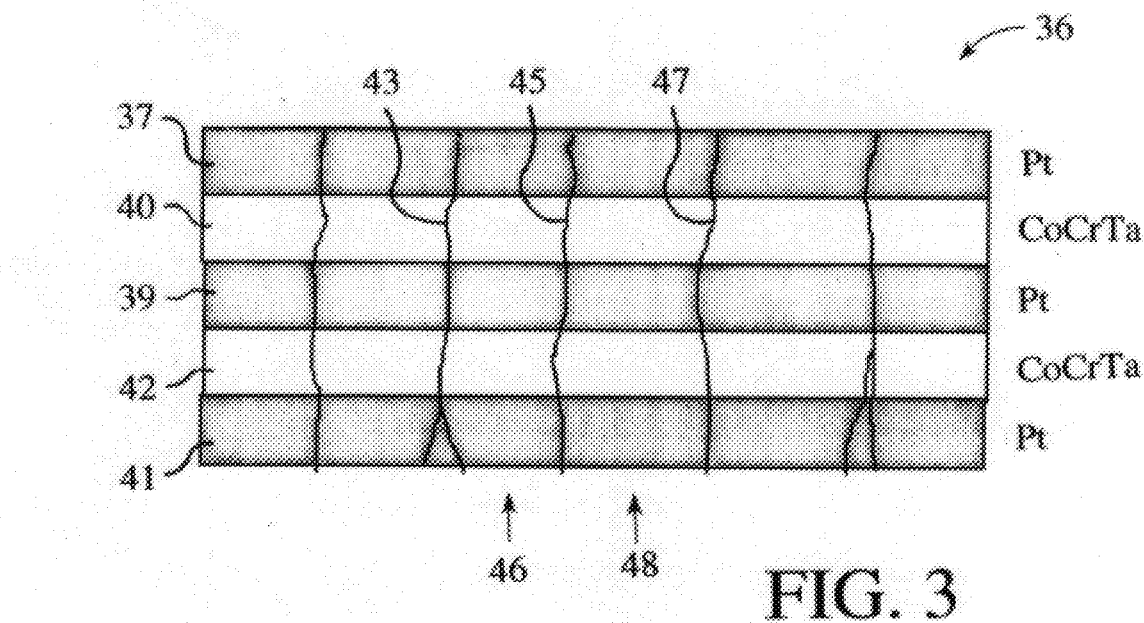
FIG. 3 is a schematic drawing of the multilayer media which results from the described method, showing Pt layers interlayered with thin layers of CoCrTa alloy.
Figure 4:
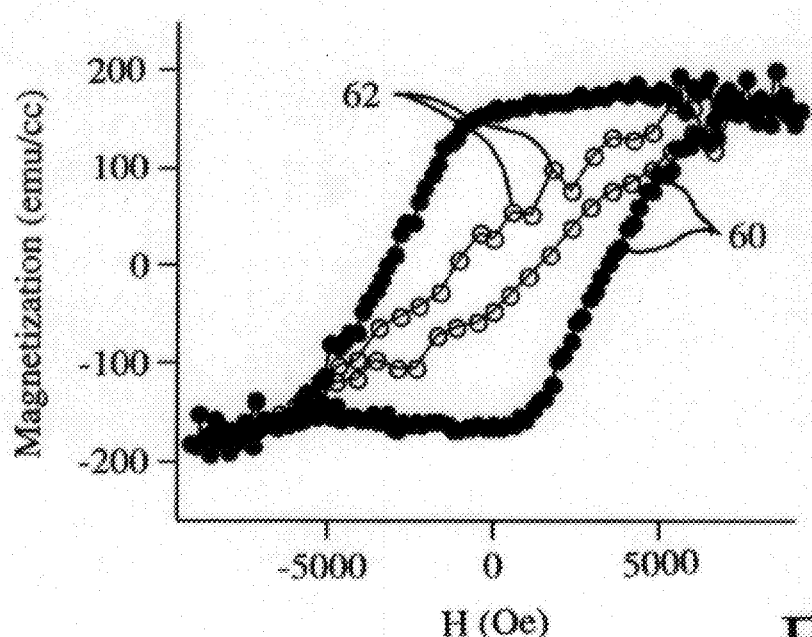
FIG. 4 is a hysteresis diagram showing magnetic hysteresis loops for grain isolated multilayer recording media. The solid circle show the loop for the perpendicular direction, the open circles for the in plane direction. The remanence ratio for this media is approximately 0.9. The shearing of the hysteresis loop is approximately $1.\frac{1}{4}\pi$.

The temperature of the substrate at the time of deposition can greatly influence the degree to which granularity, composition modulation, and smoothness of the film surface can be adequately achieved. Generally deposition at higher temperature results in more decoupled grains. Deposition at higher temperature also results in the deleterious effect of less composition modulation between the layers shown in FIG. 3, due to thermally driven interdiffusion of the constituents. The recommended operating temperature range is therefore between 100° C. and 300° C., with the lower limit set by the desire to yield decoupled grains, and the upper limit by the need to reduce intermixing between the layers. Composition modulation in the direction perpendicular to the plane of the thin film is essential to the present invention.

Grain isolation is improved by employing a non-magnetic seed layer in which segregation of nonmagnetic phases to grain boundaries occurs. An example of such a seed layer is $Co_{60}Cr_{35}Ta_5$, which is nonmagnetic at room temperature. Given the very small thickness of the recording layer, it is usually advantageous to begin the deposition process with such a granular seed layer so that the initially deposited medium layers will immediately adopt a grain-isolated structure, rather than relying of the growth kinetics described above to generate the grain isolated structure at a later stage in the medium growth.

A comparison of the recording properties of the coupled and decoupled multilayers can be made by comparing noise measurements carried out on the two media and by comparing magnetic force microscopy images. FIG. 1 shows noise power from a multilayer medium prepared according to conventional methods. FIG. 1 also shows noise power from a grain decoupled multilayer described herein. The figure shows that the noise power in the grain isolated case is reduced by more than 10 times compared to the coupled case.

Figure 5:
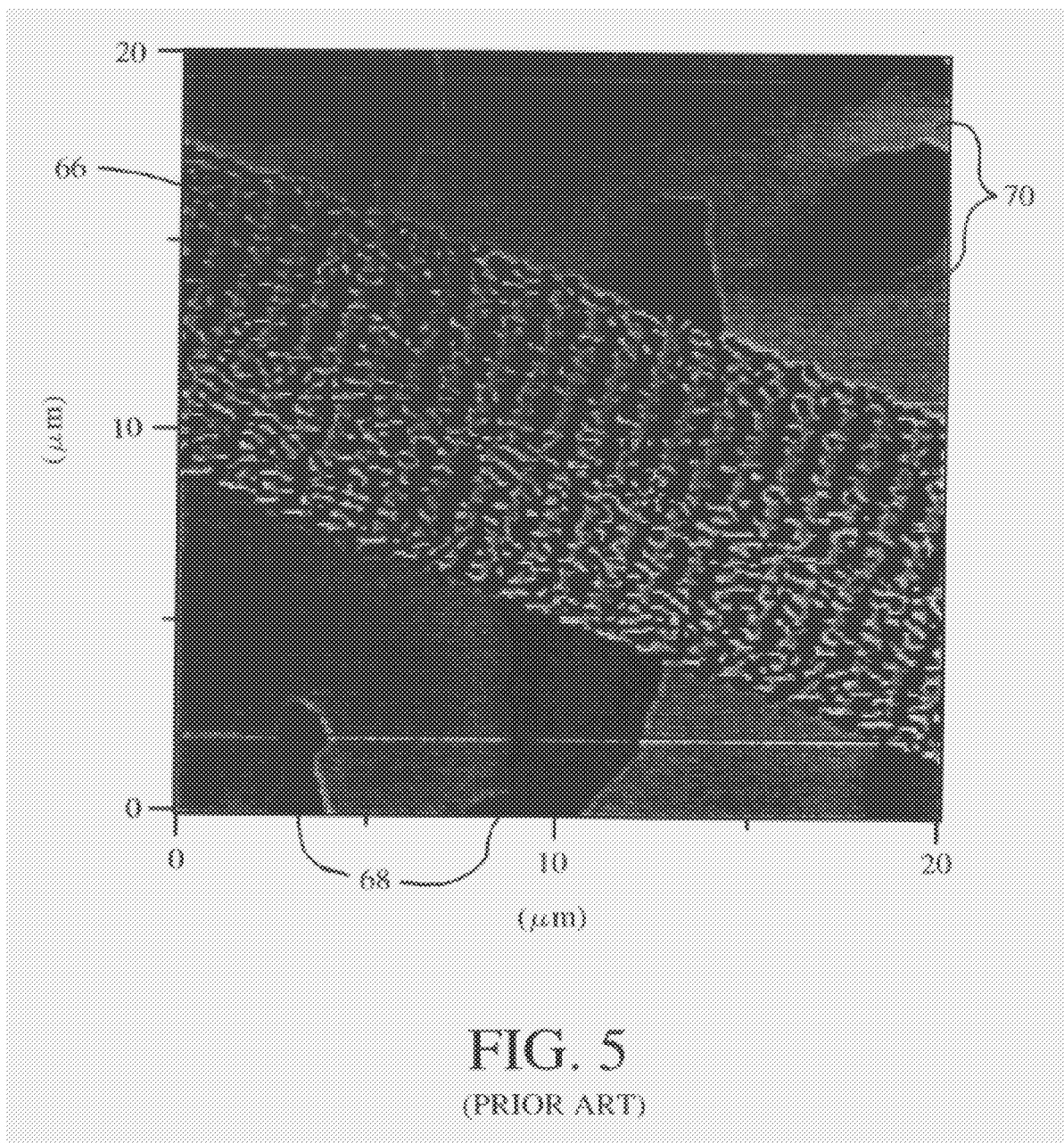
FIG. 5 is a magnetic image showing recorded transitions at a linear density of 57,000 magnetic flux transitions per inch for conventional coupled Pt/Co multilayer recording media. The dark areas represent magnetization pointing into the plane of the film, the light areas represent magnetization pointing out of the plane of the film. The regions outside of the recorded area show magnetic coupling represented by large regions of uniform magnetization. The transitions between these up and down regions are responsible for the noise in the unrecorded medium shown for coupled Co/Pt in FIG. 1.
Figure 6:
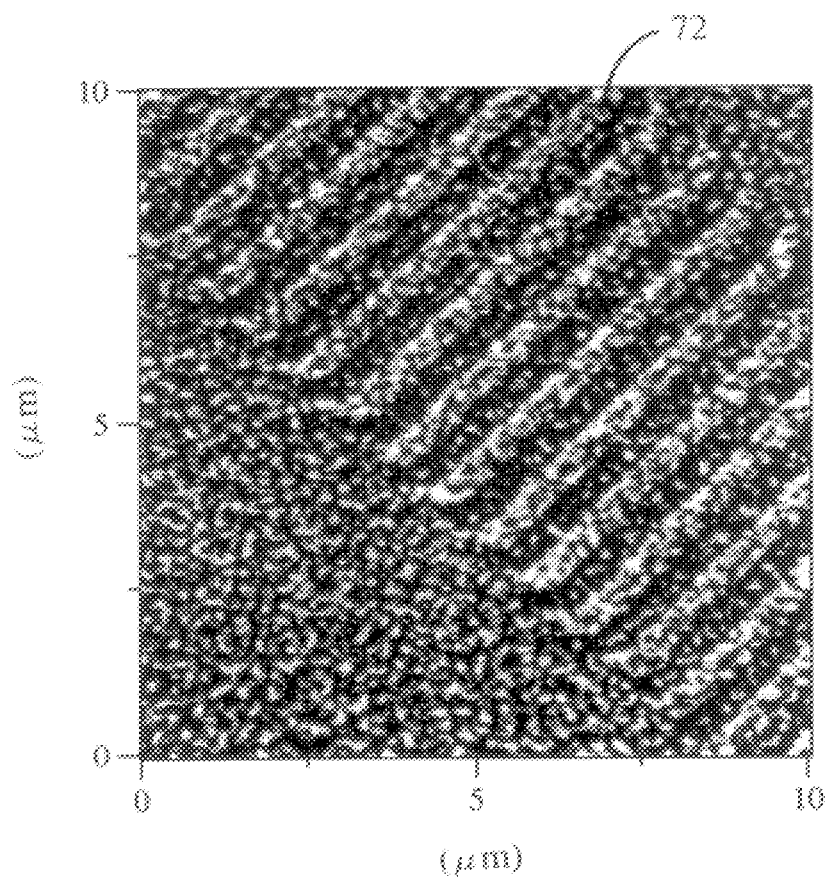
FIG. 6 shows recorded transitions at a linear density of 57,000 magnetic flux transitions per inch for grain isolated Pt/CoCrTa multilayer media. The granular magnetic properties are apparent in the image away from the written domains, where decoupling of the grains results in magnetization between adjacent grains which is not uniform, yielding an appearance of granularity in the magnetic image which closely represents the granularity of the crystal gains in the medium.
Figure 7:
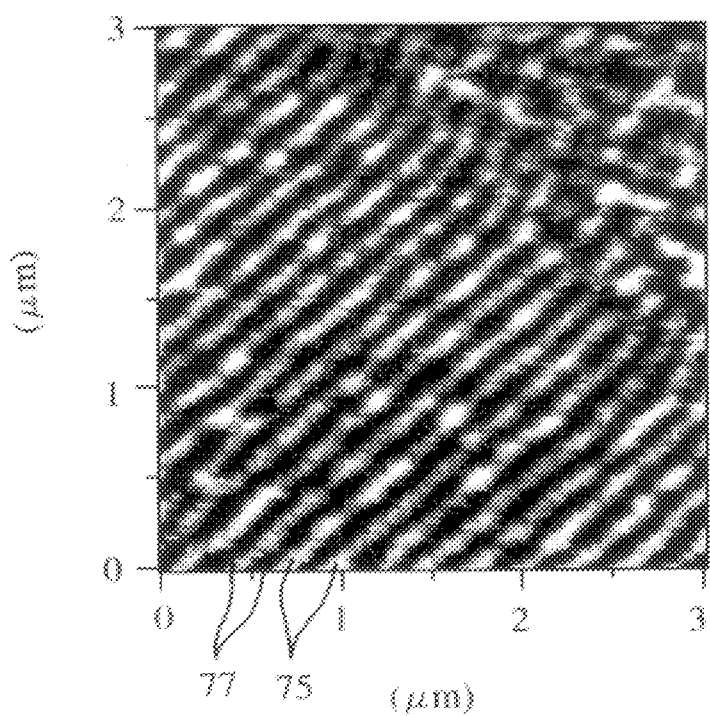
FIG. 7 shows recorded transitions at a linear density of 308,000 magnetic flux transitions per inch for grain isolated Pt/CoCrTa multilayer media. The recorded transitions remain straight, in contradistinction to the case observed for coupled multilayers.

FIG. 5 shows a magnetic force image of a written track on a hard disk on which a Pt/Co multilayer has been deposited, written at a linear density of 57,000 magnetic transitions per inch. FIG. 6 shows a magnetic force image for similar conditions for decoupled $Pt/Co_{80}Cr_{15}Ta_5$, showing that the present invention greatly improves the quality of the recording process onto the medium. The decoupled medium faithfully records the straight line image of the trailing edge of the write element, while the coupled Pt/Co medium does not faithfully record straight line domain walls. Comparison of signal and noise levels into a recording transducer for this case show much higher signals and reduced noise values for the decoupled multilayer medium. Generally, recording on the Pt/Co multilayers results in a noise component that is approximately 2 times higher than the electronic background of the recording system (This is a lower noise level than that shown in FIG. 1, because the writing process "organizes" some of the noise into written transitions). Recording on the decoupled Pt/CoCrTa multilayers results in a noise level which cannot be distinguished from the background. Similar images and observations have been made for transition densities between 50,000 transitions per inch and 350,000 transitions per inch. For instance, FIG. 7 shows recorded transitions in decoupled $Pt/Co_{80}Cr_{15}Ta_5$ multilayer media at 308,000 transitions per inch. The transitions remain of high fidelity, with a distance between transitions of 80 nanometers or three microinches. A calculation of the noise level from this image indicates that the signal to noise ratio inside of the written track is 14 times (22.7 decibels). This corresponds to a written density of more than 2 billion transitions per square inch.

EXAMPLES $Pt/Co_{80}Cr_{15}Ta_5$ and $Pd/Co_{80}Cr_{15}Ta_5$ alloy layers were prepared at different temperatures on various substrates with different layer thicknesses, and tested for recording properties and magnetic hysteresis loops. Deposition was performed sequentially from the elemental noble metal target and a stoichiometric sputtering target of composition $Co_{80}Cr_{15}Ta_5$. Samples of the prepared layers are given in Table 1. Each sample was prepared by loading the substrate into a high vacuum deposition chamber with a pressure of $2 \times 10^{-8}$ Torr. Seed layers of various thicknesses were employed to lessen the effect of the different substrates on the final magnetic properties and to begin the microstructural growth of the thin film prior to deposition of the media layer. In the case of magnetic substrates, such as nickel iron alloy, this layer also acts to exchange isolate the substrate from the media layer.

Deposition was performed using either RF or DC biased sputtering, with an ambient argon pressure of 5 mTorr. The preferred ambient sputter pressure is in the range 0.1 mTorr to 20 mTorr. Various sputter gas mixtures can be used to adjust the amount of composition modulation and roughness.

In most cases a thin hard carbon overcoat was deposited onto the media surface to protect it from wear from a recording head flown near or in contact with the overcoat.

X-ray diffraction spectra from selected samples showed low angle composition modulation peaks illustrating that the sequential deposition of the layers resulted in a layered thin film structure, with composition modulation existing in the direction out of the film plane.

Measurements of the magnetic anisotropy energy of the decoupled multilayers show that the anisotropy is higher than that of $Co_{80}Cr_{15}Ta_5$ alloys or $Co_{76}Cr_{13}Ta_4Pt_7$ alloys. Typically, these CoCrTa alloys have an anisotropy energy of $3 \times 10^5$ ergs/cm$^3$, the CoCrTaPt alloys have an anisotropy energy of $5 \times 10^5$ ergs/cm$^3$, while the $Pt/CO_{80}Cr_{15}Ta_5$ multilayers have an anisotropy energy of $9 \times 10^5$ ergs/cm$^3$.

While there have been shown and described what are considered at present to be the preferred embodiments of the present invention, it will be appreciated by those skilled in the art that modifications of such embodiments may be made. It is therefore desired that the invention not be limited to these embodiments, and it is intended to cover in the appended claims all such modifications as fall within the true spirit and scope of the invention.

TABLE 1

| # | Substrate | Nonmagnetic Seed (Thickness) | CoCrTa/Pt Thickness | Number of Bilayers | Deposition Temperature |
|---|---|---|---|---|---|
| 1 | Silicon Nitride | 800 Å | 22 Å/5 Å | 20 | 210° C. |
| 2 | Silicon Nitride | 100 Å | 15 Å/5 Å | 20 | 210° C. |
| 3 | Nickel Phosphorus | 700 Å | 10 Å/8 Å | 30 | 250° C. |
| 4 | Nickel Iron | 50 Å | 15 Å/5 Å | 20 | 250° C. |
| 5 | Nickel Phosphorus | 700 Å | 15 Å/5 Å | 20 | 30° C. |
| 6 | Nickel Phosphorus | 700 Å | 15 Å/5 Å | 60 | 250° C. |
| 7 | Nickel Phosphorus | 700 Å | 15 Å/5 Å | 60 | 280° C. |

We claim:

1. An information storage medium composed of a plurality of adjoining solid layers comprising:
   a disk-shaped substrate layer,
   a noble metal layer predominantly consisting of at least one of Pd and Pt and having a thickness of at least 2.2 Å and less than about 15 Å, and
   a plurality of Co alloy layers adjoining said noble metal layer, each of said Co alloy layers having a thickness generally greater than that of said noble metal layer and between approximately 8 Å and 50 Å, having an overall atomic concentration of Co in a range between about 60% and 95%, and including a nonmagnetic element,
   wherein said noble metal layer and said Co alloy layers share a plurality of crystal grains and a boundary between said grains, with said nonmagnetic element being disposed adjacent to said boundary.

2. The medium of claim 1, and further comprising a second noble metal layer adjoining one of said Co alloy layers, said second noble metal layer predominantly consisting of at least one of Pd and Pt and having a thickness of at least 2.2 Å and less than about 15 Å.

3. The medium of claim 1, wherein said thickness of said noble metal layer is less than 10 Å.

4. The medium of claim 1, wherein said nonmagnetic element of said Co alloy includes at least one element from the group including C, Cr, Ta, W and V.

5. The medium of claim 1, wherein said noble metal layer consists essentially of Pt.

6. The medium of claim 1, and further comprising a seed layer having crystal grains and being disposed adjacent to at least one of said noble metal layer and said Co alloy layers.

7. The medium of claim 1, and further comprising a seed layer disposed adjacent to at least one of said noble metal layer and said Co alloy layers, said seed layer composed primarily of CoCrTa having an atomic concentration of Co that is less than 60%.

8. The medium of claim 1, wherein said noble metal layer and said Co alloy layers have an overall thickness in a range between about 50 Å and 1000 Å.

9. The medium of claim 1, wherein said noble metal layer is crystallographically aligned with said Co alloy grains.

10. The medium of claim 1, and further comprising a magnetized track including a plurality of adjacent magnetic domains having substantially opposite magnetic directions, with transitions between said domains having a density of greater than 100,000 transitions per inch.

* * * * *